United States Patent [19]

Ikeuchi et al.

[11] Patent Number: 4,733,320

[45] Date of Patent: Mar. 22, 1988

[54] LINE PROTECTION SWITCH EQUIPMENT

[75] Inventors: Satoshi Ikeuchi, Kawasaki; Ikuo Taniguchi, Inagi; Kenji Yoshimoto, Chigasaki, all of Japan

[73] Assignee: Fujitsu Limited, Kawasaki, Japan

[21] Appl. No.: 896,954

[22] Filed: Aug. 15, 1986

[30] Foreign Application Priority Data

Aug. 16, 1985 [JP] Japan .................. 60-179452

[51] Int. Cl.$^4$ .......................................... H02H 7/26
[52] U.S. Cl. ............................. 361/67; 379/5; 379/221; 379/273
[58] Field of Search ........... 340/719, 784; 361/62, 361/64, 67; 379/5, 221, 273

[56] References Cited

U.S. PATENT DOCUMENTS

| | | | |
|---|---|---|---|
| 3,576,951 | 5/1971 | Uchida et al. | 379/229 |
| 3,864,533 | 6/1973 | Erlund | 379/221 |
| 4,007,339 | 2/1977 | Joel, Jr. | 379/5 |
| 4,480,193 | 10/1984 | Blahous et al. | 361/62 |

OTHER PUBLICATIONS

Fujitsu Sci. Tech. J. 21, 1(Mar. 1985), 50–52, "405 Mbit/s Single-Mode Optical Fiber Transmission System".

ICC'84 Links for the Future IEEE International Conference on Communications.

*Primary Examiner*—A. D. Pellinen
*Assistant Examiner*—Jeffrey A. Gaffin
*Attorney, Agent, or Firm*—Staas & Halsey

[57] ABSTRACT

A line protection switch equipment (LPSW) in a communication system, having a plurality of two-input and two-output switches connected between lines including a protection line and working lines, the switches being connected in series by a loop line which forms a loop, whereby by switching the switches connected to a faulty working line and to a protection line, the faulty working line is switched to become a protection line, and the former protection line becomes a working line.

7 Claims, 17 Drawing Figures

LPSW BEFORE INVENTION

NORMAL STATE

SWITCHED STATE

NORMAL STATE

SWITCHED STATE

NORMAL STATE

1st SWITCHED STATE

2nd SWITCHED STATE

LINE PROTECTION SWITCH EQUIPMENT

BACKGROUND OF THE INVENTION

1. Field of the Invention

The present invention relates to a line protection switch equipment in a communication system, for switching from a working line (i.e., a normal line) to a protection line (i.e., a standby line) to continue communication when a fault occurs on the working line.

2. Description of the Related Art

To improve the reliability of a communication system, a one to one or n to one working-protection switching system is employed for continuing the communication by separating the faulty portion and by switching to a protection equipment or to a protection line. In such an n to one working-protection switching system, the switching circuit for switching and connecting the faulty line among the working n lines and one protection line must be maintained in the switching state even when the power is cut, and should have a simple construction.

Active elements such as transistors or amplifiers cannot be employed in the switching circuit to maintain it in the switching state during a power cut off. Also, to keep the construction of the switching circuit as simple as possible, the switching circuit must not be formed by a matrix switch.

An example of a prior art reference is FUJITSU Sci. Tech. J. 21, 1 (March 1985), pp 50-52 "405 M bit/s Single-Mode Optical Fiber Transmission System".

In an n to one working-protection switching system in the prior art having n working lines and one protection line for switching and connecting the protection line in place of the faulty working line, the protection line is previously determined. The switching and connection are carried out by changing the faulty working line to a protection line and by making the protection line a working line. When the fault is recovered, the working line which became the protection line is switched to again become a working line, and the protection line which became the working line is switched to again become a protection line.

In the afore-mentioned prior communication system, the protection line is previously determined. Therefore, a disadvantage arises in that there is little freedom of line selection. To remove this disadvantage, a floating (or quasi-fixed) system is known. In the floating protection system, the working-protection switching can be carried out without specifically determining a protection line so that the freedom of line selection is increased. The switching circuit, however, has a matrix switch construction. Further, since a high speed data switching of several ten to several hundred mega bits/s must be effected in accordance with the degree of multiplication, the switching circuit cannot be realized by a simple contact construction. Therefore, the circuit having a matrix switch construction has a disadvantage of being large in scale.

SUMMARY OF THE INVENTION

The object of the present invention is to provide a new quasi-fixed protection system which is adaptable by using a switching circuit having a relatively simple construction.

According to the present invention, there is provided a line protection switch equipment in a communication system, connected between a plurality of lines, one of the lines being operatively used as a protection line, and the other of the lines being operatively used as a working line.

The line protection switch equipment comprises: a plurality of two-input and two-output switches, respectively connected between the lines, and a loop line for connecting the two-input and two-output switches to each other in series, forming a loop; each of the two-input and two-output switches having a first input terminal, a second input terminal, a first output terminal and a second output terminal. The first input terminal and the first output terminal are connected to a corresponding one of the lines, and the second input terminal and the second output terminal are connected to the loop line; whereby, by switching the two-input and two-output switches corresponding to a faulty working, line and to the protection line, the faulty working line is switched to become a protection line, and the protection line becomes a working line.

BRIEF DESCRIPTION OF THE DRAWINGS

The above object and features of the present invention will be better understood from the following description of the preferred embodiments with reference to the accompanying drawings, wherein.

DESCRIPTION OF THE PREFERRED EMBODIMENTS

For better understanding of the present invention, the background and the prior art will first be described with reference to FIGS. 1 and 2.

Figure 1:
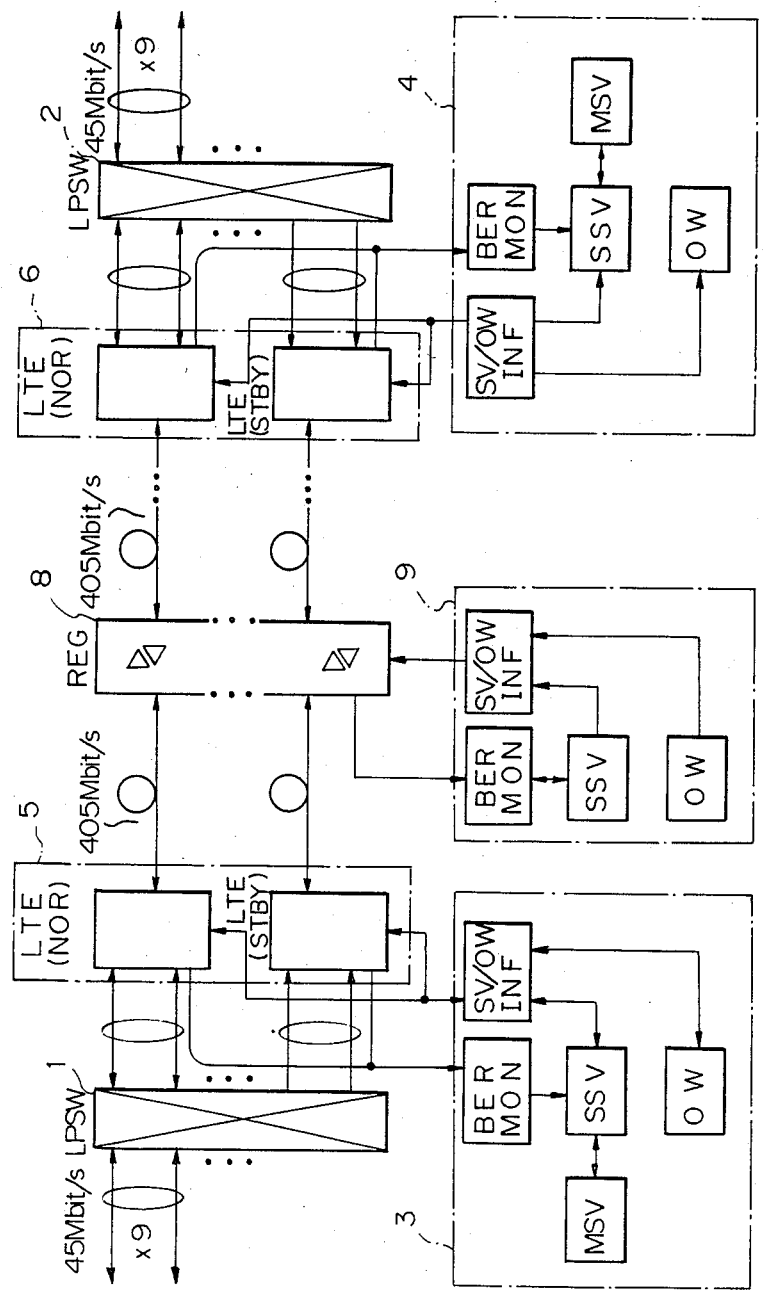
FIG. 1 is a block diagram illustrating a data transmission system of the prior art, for explaining the background of the present invention.

FIG. 1 is a block diagram illustrating a data transmission system in the prior art disclosed in the previously mentioned reference (FUJITSU Sci. Tech.). The system shown in FIG. 1 includes line protection switch equipment (LPSW) 1 and 2, control portions 3 and 4, and line terminal equipment (LTE) 5 and 6, which are connected via 3R type regenerator (REG) 8 controlled by a control portion 9. The line terminal equipment 5 and 6 includes normal (NOR) equipment and standby (STBY) equipment. The control portions 3 and 4 include master (MSV) and slave (SSV) supervisory equipment, bit error rate monitoring (BER MON) equipment, order wire (OW) equipment, and SV/OW interface (INF) equipment. The control portion 9 also includes BER MON equipment, SSV equipment, OW equipment, and SV/OW INF equipment.

The present invention relates to the construction of the line protection switch equipment (LPSW) 1 or 2.

Figure 2:
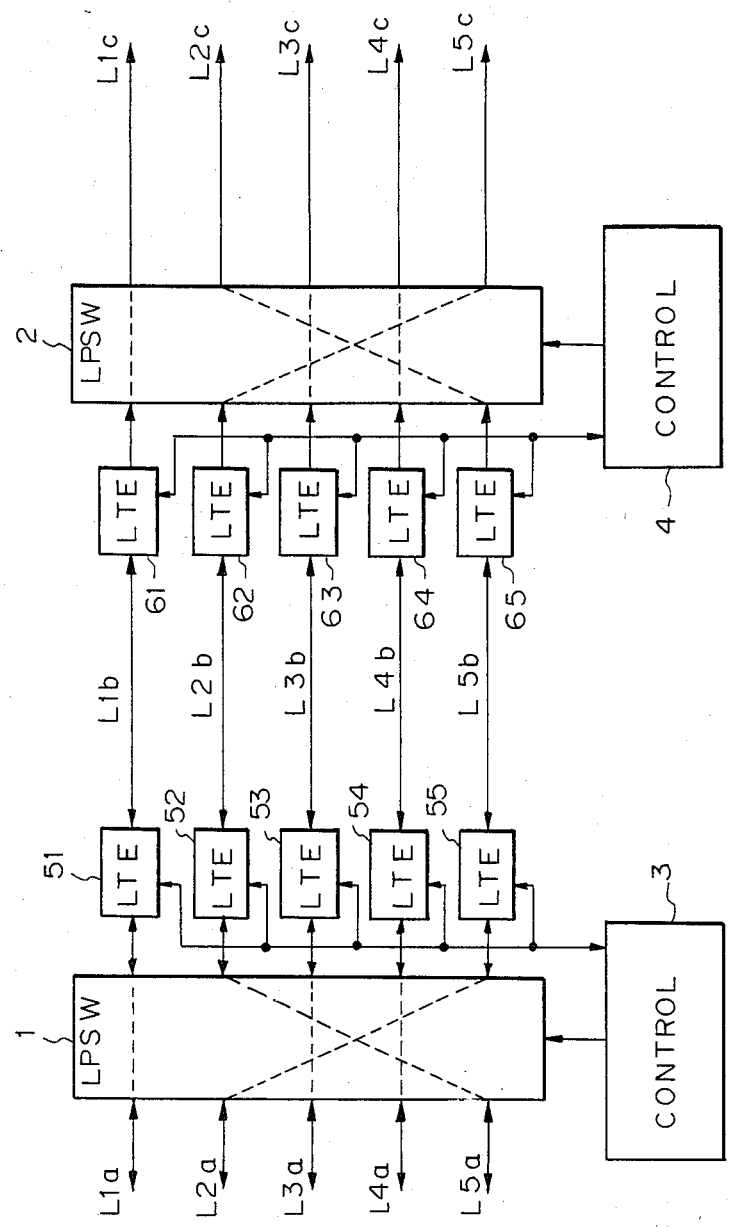
FIG. 2 is a simplified block diagram of FIG. 1.

FIG. 2 is a simplified block diagram of FIG. 1. In FIG. 2, the line protection switch equipment (LPSW) 1 is connected between lines $L_{1a}$–$L_{5a}$ and line terminal equipment (LTE) 51–55. The line terminal equipment (LTE) 51–55 and 61–65 are connected via lines $L_{1b}$–$L_{5b}$. The line protection switch equipment (LPSW) 2 is connected between the line terminal equipment (LTE) 61–65 and lines $L_{1c}$–$L_{5c}$. The control portions 3 and 4 supervise the state of the line terminal equipment (LTE) 51–55 and 61–65 and control the path in the line protection switch equipment (LPSW) 1 and 2. The lines $L_{1a}$–$L_{15a}$, $L_{1b}$–$L_{5b}$ and $L_{1c}$–$L_{5c}$ conduct a high-speed multitransmission of, for example, 405 mega-bit/s, and are constructed by coaxial cables or optical fibers. When constructed by optical fibers, electrical-optical converting elements such as semiconductor lasers and optical-electrical converting elements such as avalanche photodiodes (APD) are provided in the line terminal equipment 51–55 and 61–65.

In such a conventional communication system, the lines $L_{1a}$–$L_{4a}$, $L_{1b}$–$L_{4b}$, and $L_{1c}$–$L_{4c}$, for example, are predetermined as working lines, and the lines $L_{5a}$, $L_{5b}$ and $L_{5c}$ are predetermined as protection lines. The line protection switch equipment (LPSW) 1 usually connects the lines $L_{1a}$–$L_{5a}$ to the corresponding line terminal equipment 51–55. If a fault occurs, for example, in the working line $L_{2b}$, the control portions 3 and 4 respectively receive control information from the line terminal equipment (LTE) 52 and 62 so that, as illustrated by dotted lines, the line protection switch equipment (LPSW) 1 and 2 make a path between the protection lines $L_{5a}$ and $L_{5c}$ via the faulty working line $L_{2b}$ and simultaneously between the working lines $L_{2a}$ and $L_{2c}$ via the protection line $L_{5b}$. Then, the control portions 3 and 4 determine whether the fault has been recovered on the line $L_{2b}$, which has been made a protection line. When the recovery of the fault is detected, control information is transmitted and received between the control portions 3 and 4 so that the line protection switch equipment 1 and 2 switches to the original connecting state, whereby the line $L_{5b}$ again becomes the protection line and the line $L_{2b}$ again becomes the working line.

In the afore-mentioned prior communication system, the protection line is previously determined and therefore, there is little freedom of line selection. To remove such a disadvantage a floating protection system is known in which a protection line is not previously determined but any line can be determined as a protection line during operation. In a floating protection system in the prior art, switching between a working line and a protection line can be carried out without specifically determining a protection line so that the freedom of line selection is increased. The line protection switch equipment in the prior art floating protection system, however, comprises a matrix switch which is very complicated. Further, since high speed data switching of several ten to several hundred mega-bit/s must be effected in accordance with the number of channels multiplexed in one coaxial cable or optical fiber, line protection switch equipment having matrix construction cannot be realized by a simple contact structure. Therefore, the matrix switch construction has a disadvantage of being large in scale.

Figure 3A:
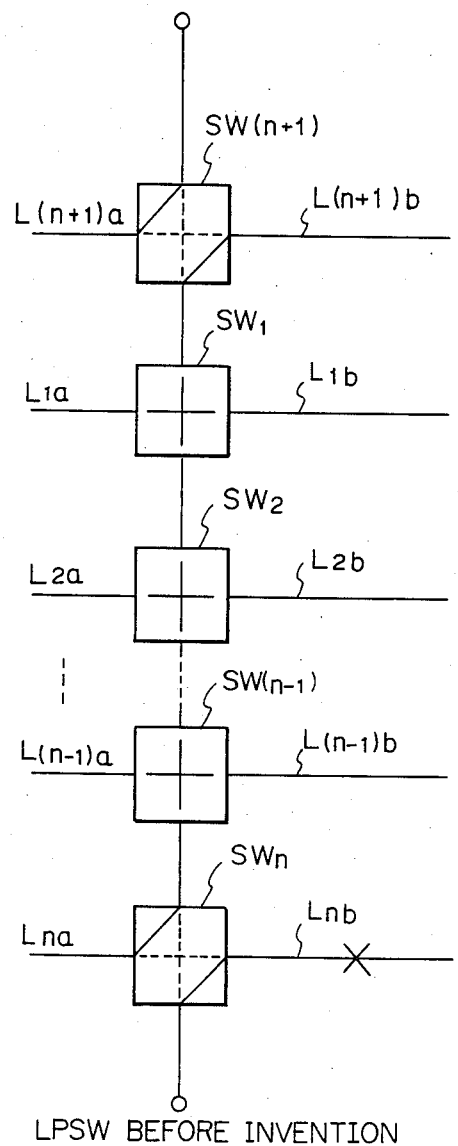
FIG. 3A is a block diagram of line protection switch equipment before the present invention.
Figure 3B:
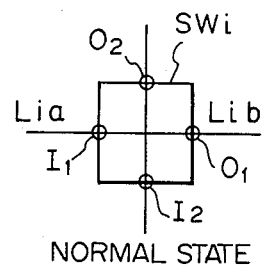
FIG. 3B shows a normal state of a two-input and two-output switch in the line protection switch equipment shown in FIG. 3A.
Figure 3C:
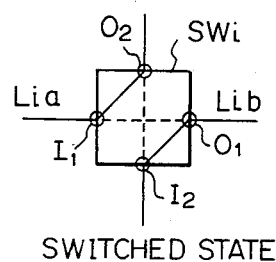
FIG. 3C shows a switched state of the two-input and two-output switch in the line protection switch equipment shown in FIG. 3A.

FIG. 3A is a block diagram of line protection switch equipment (LPSW) developed before the creation of the present invention. Note: Although the LPSW shown in FIG. 3A was developed before the present invention, it is not publicly known in the art. The LPSW shown in FIG. 3A includes a plurality of two-input and two-output switches $SW_1$, $SW_2$, ... $SW_{(n-1)}$, $SW_n$ and $SW_{(n+1)}$ each having a first input terminal $I_1$, a second input terminal $I_2$, a first output terminal $O_1$, and a second output terminal $O_2$, as shown in FIGS. 3B and 3C. The switches $SW_1$, $SW_2$, ..., and $SW_{(n+1)}$ are respectively connected between input lines $L_{ia}$ and output lines $L_{ib}$, where i = 1, 2, ... and (n+1). Further, the switches $SW_{(n+1)}$, $S_1$, $S_2$, ... and $S_n$ are connected in series by connecting the second output terminal $O_2$ of one switch to the second input terminal $I_2$ of the adjacent switch.

The line $L_{(n+1)a}$ or $L_{(n+1)b}$ is predetermined to be a protection line. The other lines $L_{1a}$, $L_{2a}$, ... and $L_{na}$, and $L_{1b}$, $L_{2b}$, ..., and $L_{nb}$ are predetermined as working lines. The lines $L_{(n+1)a}$ and $L_{(n+1)b}$ are predetermined as protection lines.

In the normal state of each switch $SW_i$, the first input terminal $I_1$ is connected to the first output terminal $O_1$, and the second input terminal $I_2$ is connected to the second output terminal $O_2$, as shown in FIG. 3B.

When a fault occurs on, for example, the line $L_{nb}$ as illustrated in FIG. 3A by a mark "X", the state of the switches $SW_n$ and $SW_{(n+1)}$ is changed so that the first input terminal $I_1$ is connected to the second output terminal $O_2$, and the second input terminal $I_2$ is connected to the first output terminal $O_1$, as shown in FIGS. 3A, and 3C. Thus, the working line $L_{na}$ is connected through the switches $SW_n$, $SW_{n-1}$, ..., $SW_1$, and $SW_{(n+1)}$ to the protection line $L_{(n+1)b}$.

The LPSW shown in FIG. 3A, however, has a disadvantage in that there is little flexibility in the selection of the protection line, since the protection line $L_{(n+1)a}$ or $L_{(n+1)b}$ is previously determined. Further, if a line connecting adjacent switches is disconnected, the line protection switch equipment becomes inoperative.

The object of the present invention is to provide a new floating system adaptable in a communication system by using a line protection switch equipment having relatively simple construction.

Figure 4:
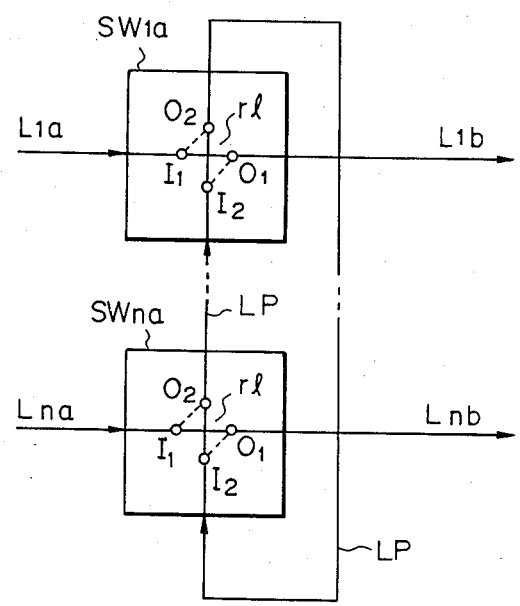
FIG. 4 is a block diagram illustrating the basic concept of line protection switch equipment according to the present invention.

The basic concept of line protection switch equipment according to the present invention is described with reference to FIG. 4. In FIG. 4, the line protection switch equipment LPSW according to the present invention is provided in a communication system. The LPSW in FIG. 4 is connected in series with lines $L_{1a}$ and $L_{1b}, \ldots,$ and $L_{na}$ and $L_{nb}$. One of the line $L_{1b}, \ldots,$ and $L_{nb}$ is operatively used as a protection line. The other lines $L_{2b}$ (not shown), ..., and $L_{nb}$ are operatively used as working lines. The LPSW in FIG. 4 comprises a plurality of two-input and two-output switches $SW_{ia}$, where $i=1, 2, \ldots,$ and n. The switches $SW_{ia}$ are respectively connected in series with the lines $L_{ia}$ and $L_{ib}$, where $i=1, 2, \ldots,$ and n. Each switch $SW_{ia}$ has a first input terminal $I_1$, a second input terminal $I_2$, a first output terminal $O_1$ and a second output terminal $Q_2$. The first input terminal $I_1$ and the first output terminal $O_1$ are respectively connected to the corresponding lines $L_{ia}$ and $L_{ib}$. The second input terminal $I_2$ and the second output terminal $O_2$ are connected to the loop line LP.

By switching the two-input and two output switches corresponding to a faulty working line and to the protection line, the faulty working line is switched to become a protection line.

According to the LPSW shown in FIG. 4, any one of the lines $L_{1b}, \ldots,$ and $L_{nb}$ can be made a protection line. For example, assume that the line $L_{1b}$ is a working line, and the line $L_{nb}$ is a protection line. Then, when a fault occurs on the working line $L_{1b}$, if the relay contacts r1 are switched as illustrated by dotted lines, the line $L_{1a}$ is connected, via the terminals $I_1$ and $O_2$ of the switch $SW_{1a}$, the loop line LP and the terminals $I_2$ and $O_1$, to the line $L_{nb}$. Thus, the line $L_{nb}$, which was a protection line, becomes a working line, and the line $L_{na}$ is connected, via the terminals $I_1$ and $O_2$, the loop line LP, and the terminals $I_2$ and $O_1$, to the line $L_{1b}$. Thus, the line $L_{1b}$ becomes a protection line.

When a signal on the line $L_{na}$ must be transmitted to the line $L_{1b}$, the switches $SW_{1a}$ and $SW_{na}$ are made so that the terminals $I_1$ and $I_2$ are connected and the terminals $O_1$ and $O_2$ are connected in the respective switches. Thus, the signal on the line $L_{na}$ is transmitted through the terminals $I_1$ and $I_2$ of the switch $SW_{na}$, the loop LP, the terminal $O_2$ of the switch $SW_{1a}$, and the terminal $O_1$ of the switch the switch $SW_{1a}$, to the terminal $O_1$ of the switch $SW_{1a}$, to the line $L_{1b}$.

By providing the loop line LP, it has become possible to transmit a signal from the line $L_{1a}$ to the line $L_{nb}$ even when the line $LP_o$ between the switches $SW_{1a}$ and $SW_{na}$ is disconnected.

Embodiments of the present invention will now be described in detail with reference to the drawings.

Figure 5A:
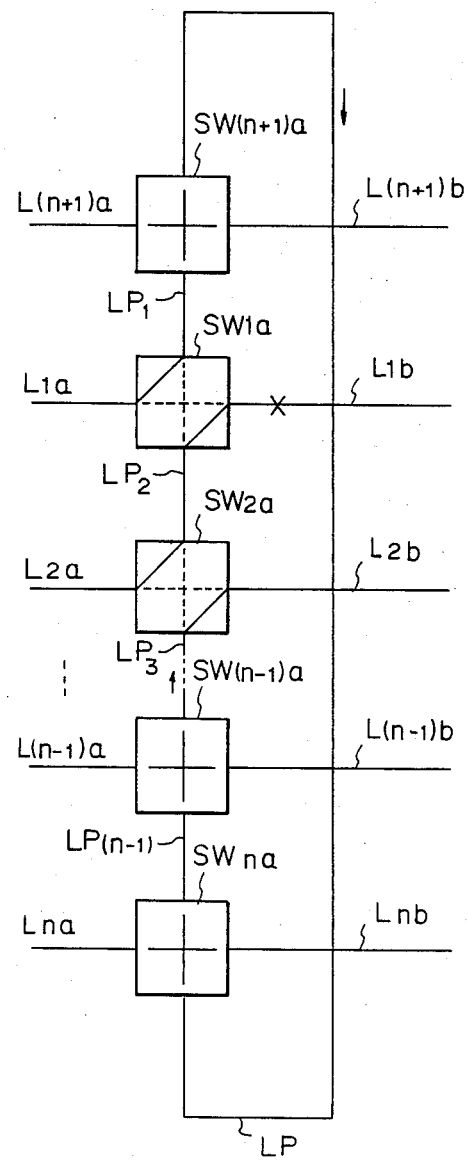
FIG. 5A is a block diagram illustrating line protection switch equipment according to an embodiment of the present invention.

FIG. 5A shows a first embodiment of the present invention. The circuit structure shown in FIG. 5A is substantially the same as the circuit shown in FIG. 4. The LPSW shown in FIG. 5A includes a plurality of two-input and two-output switches $SW_{1a}, SW_{2a}, \ldots, SW_{(N-1)a}, SW_{na}$ and $SW_{(n+1)a}$. The switch $SW_{ia}$ (where $i=1, 2, \ldots,$ or n+1) is connected between corresponding lines $L_{ia}$ and $L_{ib}$. A loop line LP connects the switches $SW_{(n+1)a}, SW_{2a}, \ldots,$ and $SW_{na}$ in series.

Figure 5B:
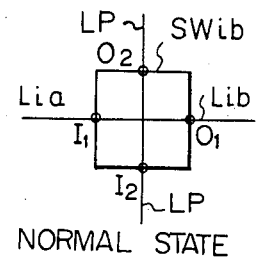
FIG. 5B shows a normal state of a two-input and two-output switch in the line protection switch equipment shown in FIG. 5A.
Figure 5C:
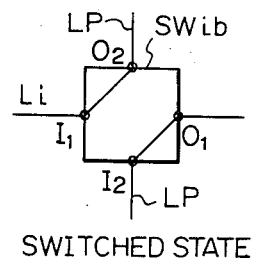
FIG. 5C shows a switched state of the two-input and two-output switch in the line protection switch equipment shown in FIG. 5A.

FIG. 5B shows a normal state of a two-input and two-output switch $SW_{ia}$ in the LPSW shown in FIG. 5A; and FIG. 5C shows a switched state of the switch $SW_{ia}$. In the normal state shown in FIG. 5B, the first input terminal $I_1$ is connected to the first output terminal $O_1$; and the second input terminal $I_2$ is connected to the second output terminal $O_2$. In the switched state shown in FIG. 5C, the first input terminal $I_1$ is connected to the second output terminal $O_2$; and the second input terminal $I_2$ is connected to the first output terminal $O_1$.

By the construction shown in FIG. 5A, any line in the lines $L_{1b}, L_{2b}, \ldots,$ and $L_{nb}$ can be arbitrarily switched from being a working line to being a protection line, when the protection line $L_{(n+1)b}$ is switched from being a protection line to being a working line, in the same way as described with reference to FIG. 4. Accordingly, the flexibility in the selection of a protection line is increased in comparison with the LPSW created before the present invention, as shown in FIG. 3A.

Each of the two-input and two-output switches $SW_{1a}-SW_{(n+1)a}$ is constructed by a relay in which the contacts are self-latched by residual magnetism, maintaining the normal state or the switched state even after the power is cut off. Also, transfer contacts are employed as the relay contacts.

Figure 5D:
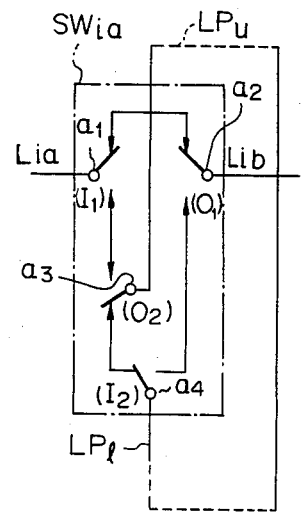
FIG. 5D is a circuit diagram of the two-input and two-output switch in the line protection switch equipment shown in FIG. 5A.

FIG. 5D is a circuit diagram of the two-input and two-output switch $SW_{ia}$ in the LPSW shown in FIG. 5A. The switch $SW_{ia}$ includes transfer contacts a1–a4 of a self-latching type relay (not shown). The illustrated state shows the normal state shown in FIG. 5B in which the opposing terminals $I_1$ and $O_1$, and $I_2$ and $O_2$ are connected. Therefore, the lines $L_{ia}$ and $L_{ib}$ are connected via the transfer contacts a1 and a2, and the loop lines LP are connected via the transfer contacts a3 and a4.

When the two-input and two-output switch $SW_{ia}$ carries out a switching operation, the line $L_{ia}$ is connected to the upper loop line $LP_u$ via the transfer contacts a1 and a3; and the line $L_{ib}$ is connected to the lower loop line $LP_l$ via the transfer contacts a3 and a4, resulting in the switched state illustrated in FIG. 5C.

There are, however, some problems in the LPSW shown in FIG. 5A. That is, when a fault occurs on the working line $L_{1b}$ and when a protection line, for example, $L_{2b}$ should be used in place of the faulty working line $L_{1b}$, the signal from the line $L_{1a}$ to the line $L_{2b}$ must be transmitted through a considerably long path. That is, the switches $SW_{1a}$ and $SW_{2a}$ are turned to their switched states as illustrated in FIG. 5A by solid lines so that a signal on the line $L_{1a}$ is transmitted, through the first input terminal $I_1$ and the second output terminal $O_2$ of the switch $SW_{1b}$, the loop line $LP_1$, the switch $SW_{(n+1)a}$, the loop line LP, the switches $SW_{na}$, $SW_{(n-1)a}, \ldots,$ and the second input terminal $I_2$ and the first output terminal $O_1$ of the switch $SW_{2a}$, to the line $L_{2b}$. This long path disadvantageously causes a long signal delay. The long path is necessary because the transmitting direction through the loop line LP is determined as one direction, i.e., from the switch $SW_{(n+1)a}$ to the switch $SW_{na}$ as illustrated by an arrow in FIG. 5A.

Figure 6B:
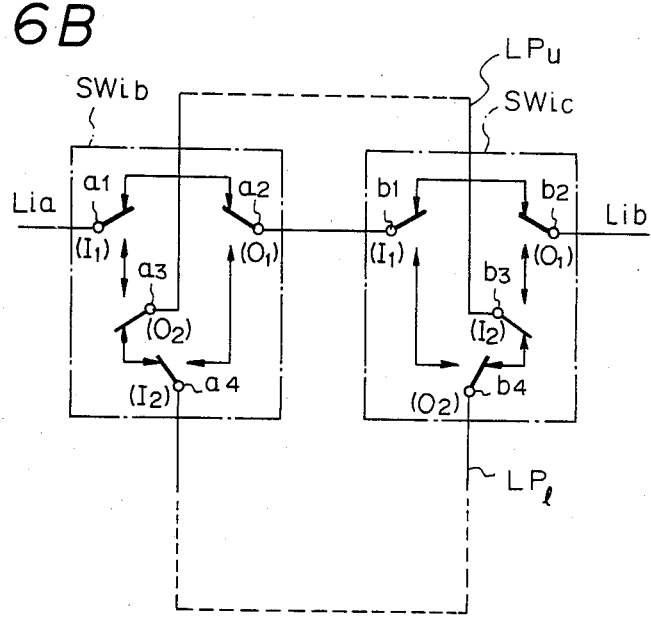
FIG. 6B is a circuit diagram of two two-input and two-output switches in the line protection switch equipment shown in FIG. 6A.
Figure 6A:
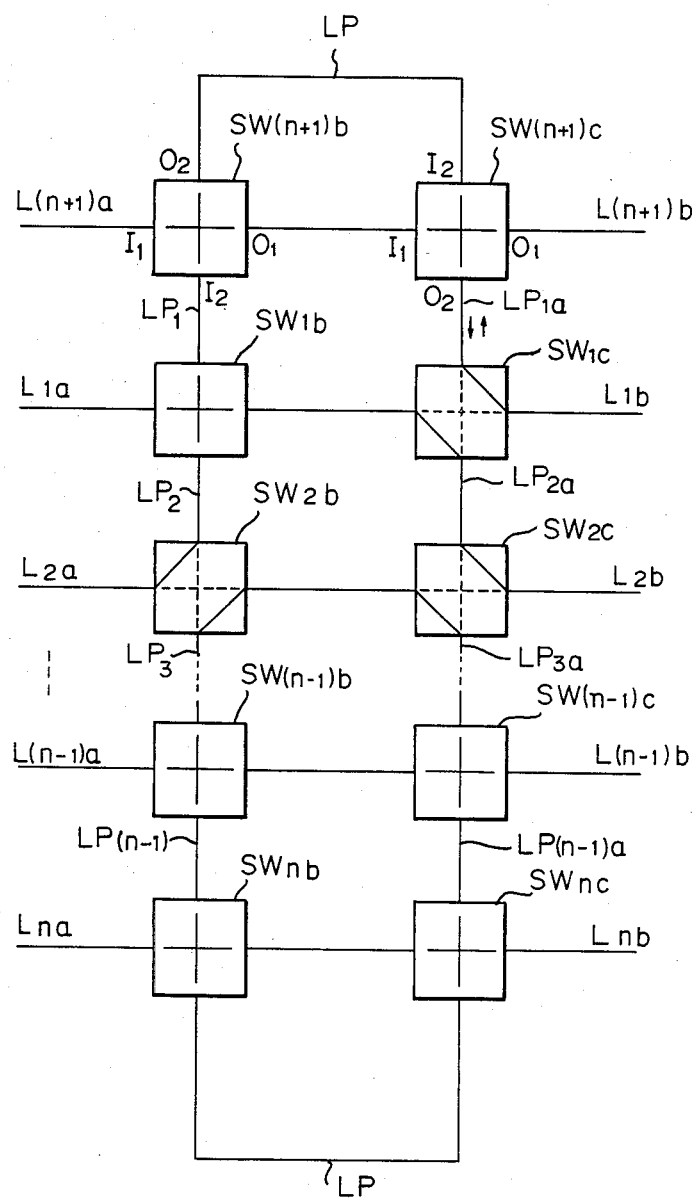
FIG. 6A is a block diagram illustrating line protection switch equipment, according to another embodiment of the present invention.

FIG. 6A shows a second embodiment of a line protection switch equipment according to the present invention. In FIG. 6A, two switches $SW_{ib}$ and $SW_{ic}$ are inserted between the lines $L_{ia}$ and $L_{ib}$, where $i=1, 2, \ldots,$ n and (n+1). The loop line LP connects the switches $SW_{(n+1)b}, SW_{1b}, SW_{2b}, \ldots$ and $SW_{nb}$ in series, and connects the switches $SW_{(n+1)c}, SW_{1c}, Sw_{2c}, \ldots,$ and $SW_{nc}$ in series. The loop line LP also connects the switches $SW_{(n+1)b}$ and $SW_{(n+1)c}$ in series, and connects the switches $SW_{nc}$ and $SW_{nb}$ in series. That is, the second output terminal $O_2$ of a switch $SW_{ib}$ is connected to the second input terminal of the adjacent switch $SW_{(i-1)b}$; and the second output terminal $O_2$ of a switch $SW_{jc}$ is connected to the second input terminal $I_2$ of a switch $SW_{(j+1)c}$, where i and j are 1, 2, ..., or n. The second terminal $O_2$ of the switch $SW_{1b}$ is connected to the second input terminal $I_2$ of the switch $SW_{(n+1)b}$. The second output terminal $O_2$ of the switch $SW_{(n+1)c}$ is connected to the second input terminal $I_2$ of the switch $SW_{1c}$.

In the operation of the LPSW shown in FIG. 6A, assume that the lines $L_{1a}$ and $L_{1b}$ are protection lines; and that the lines $L_{2a}$ and $L_{2b}$ are working lines. In this state, the protection lines $L_{1a}$ and $L_{1b}$ are connected by the switches $SW_{1b}$ and $SW_{1c}$; and the working lines $L_{2a}$ and $L_{2b}$ are connected by the switches $SW_{2b}$ and $SW_{2c}$. When a fault occurs on the working line $L_{2b}$, the states of the switches $SW_{2b}$, $SW_{1c}$ and $SW_{2c}$ are changed from the normal state (see FIG. 5B) to the switched state (see FIG. 5C) as illustrated in FIG. 6A by solid lines. Thus, a signal on the working line $L_{2a}$ is transmitted, through the switches $SW_{2b}$, the loop line $LP_2$, the swtich $SW_{1b}$, the loop line $LP_1$, switch $SW_{(n+1)b}$, the loop line LP, the switch $SW_{(n+1)c}$, the loop $LP_{1a}$, and the switch $SW_{1c}$ to the protection line $L_{1b}$ which is now a working line. Also, a signal on the protection line $L_{1a}$ is transmitted, through the switches $SW_{1b}$, $SW_{1c}$ and $SW_{2c}$, to the working line $L_{2b}$ which is now a protection line. Accordingly, the signal path in the LPSW in FIG. 6A is shorter than the signal path in the LPSW in FIG. 5A. This advantageous effect is obtained because the signal direction on the line loop $LP_1$, $LP_2$, ..., $LP_{n-1}$, $LP_{1a}$, $LP_{2a}$, $LP_{3a}$, ... may be arbitrarily selected in accordance with the switching states of the respective switches.

FIG. 6B shows the two-input and two-output switches $SW_{ib}$ and $SW_{ic}$ in the afore-mentioned second embodiment, in which the two-input and two-output switches $SW_{ib}$ and $SW_{ic}$ respectively have transfer contacts a1-a4 and b1-b4 of a self-latching type relay (not shown). The illustrated state is a normal state in which the opposing terminals $I_1$ and $O_1$, and $I_2$ and $O_2$ are connected so that the lines $L_{ia}$ and $L_{ib}$ are connected, and the loop line LP is electrically separated from the lines $L_{ia}$ and $L_{ib}$.

When the switch $SW_{ic}$ carries out a switching operation, the transfer contacts a1-a4 are switched from the illustrated state so that the adjacent terminals $I_1$ and $O_2$, and $I_2$ and $O_1$ are connected. Thus, the line $L_{ia}$ is connected to the upper loop line $LP_u$, and the line between the switches $SW_{ic}$ and $SW_{ib}$ is connected to the lower loop line $LP_l$.

Although the second embodiment shown in FIG. 6A has an advantage of short signal path as described before, it has a large scale circuit because twice the number of switches must be provided compared to the number of switches in the first embodiment shown in FIG. 5A.

Figure 7A:
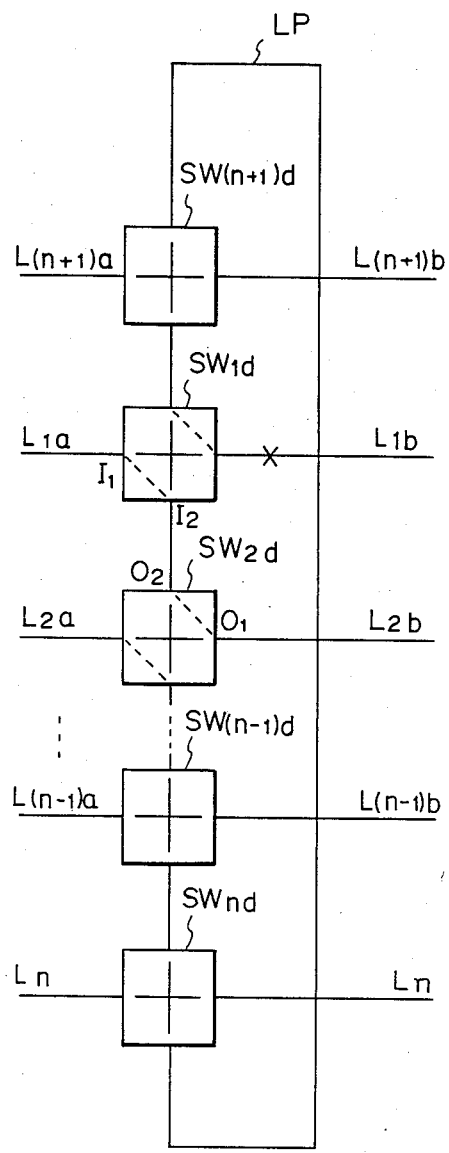
FIG. 7A is a block diagram illustrating line protection switch equipment, according to still another embodiment of the present invention.
Figure 7B:
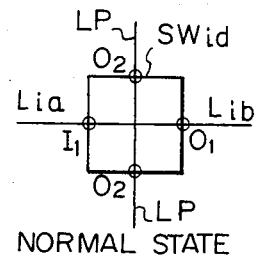
FIG. 7B shows a normal state of a two-input and two-output switch in the line protection switch equipment shown in FIG. 7A.
Figure 7C:
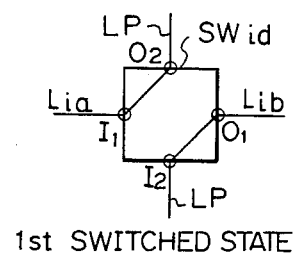
FIG. 7C shows a first switched state of the two-input and two-output switch in the line protection switch equipment shown in FIG. 7A.
Figure 7D:
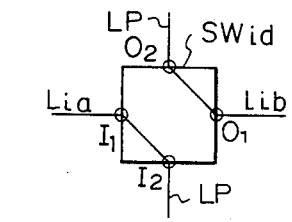
FIG. 7D shows a second switched state of the two-input and two-output switch in the line protection switch equipment shown in FIG. 7A.

FIG. 7A shows a third embodiment of a line protection switch equipment according to the present invention. FIGS. 7B to 7D respectively show switching states of a two-input and two-output switch $SW_{id}$. The only difference between the first embodiment shown in FIG. 5A and the third embodiment shown in FIG. 7A is that the switch $SW_{id}$ in FIG. 7A has, in addition to the first switched state shown in FIG. 7C which is the same as switched state of FIG. 5C, a second switched state as shown in FIG. 7D. In the second switched state shown in FIG. 7D, the first input terminal $I_1$ is connected to the second input terminal $I_2$, and the first output terminal $O_1$ is connected to the second output terminal $O_2$. By this construction, when a fault occurs on the working line $L_{1b}$ so that a signal on the working line $L_{1a}$ must be transmitted through a protection line, for example, $L_{2b}$, the switches $SW_{1d}$ and $SW_{2d}$ are switched to their second switched states as illustrated in FIG. 7A by dotted lines. Thus, the signal on the working line $L_{1a}$ can be transmitted, through the first and second input terminals $I_1$ and $I_2$ of the switch $SW_{1d}$ and through the second and first output terminals $O_2$ and $O_1$ of the switch $SW_{2d}$, to the protection line $L_{2b}$. Thus, in comparison with the signal path from the line $L_{1a}$ through the switch $SW_{1d}$, $SW_{(n+1)d}$, the loop line LP, the switches $SW_{nd}$, $SW_{(n-1)d}$, ..., and $SW_{2d}$, to the line $L_{2b}$ as in the first embodiment shown in FIG. 5A, the signal path in this third embodiment is very short. In addition, the number of switches in the third embodiment is half that of the switches in the second embodiment.

Figure 7E:
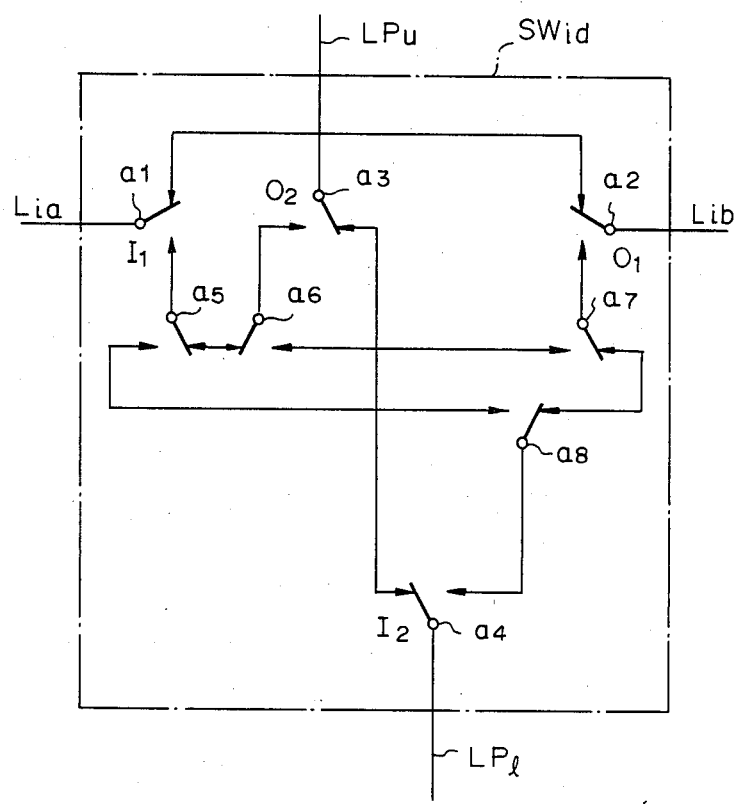
FIG. 7E is a circuit diagram of the two-input and two-output switch in the line protection switch equipment shown in FIG. 7A.

FIG. 7E is a circuit diagram of the two-input and two-output switch $SW_{id}$ in the LPSW shown in FIG. 7A. The switch $SW_{id}$ includes transfer contacts a1-a8 of a self-latching type relay (not shown). The illustrated state shows the normal state shown in FIG. 7B in which the opposing terminals $I_1$ and $O_1$, and $I_2$ and $O_2$ are connected. Therefore, the lines $L_{ia}$ and $L_{ib}$ are connected via the transfer contacts a1 and a2, and the loop lines LP are connected via the transfer contacts a3 and a4.

When the two-input and two-output switch $SW_{id}$ carries out a switching operation, the line $L_{ia}$ is connected to the upper loop line $LP_u$ via the transfer contacts a1, a5, a6 and a3; and the line $L_{ib}$ is connected to the lower loop line $LP_l$ via the transfer contacts a2, a7, a8 and a4, resulting in the switched state illustrated in FIG. 7C.

When the two-input and two-output switch $SW_{id}$ carries out another switching operation, the line $L_{ia}$ is connected to the lower loop line $LP_1$ via the transfer contacts a1, a5, a8 and a4; and the line $L_{ib}$ is connected to the upper loop line $LP_u$ via the transfer contacts a2, a7, a6 and a3, resulting in the switched state illustrated in FIG. 7D.

Also, when a construction is provided in which the transfer contacts a1-a4 and a5-a8 are operated by separate relays, the lines $L_{ia}$ and $L_{ib}$ can be connected to either one of the upper loop line $LP_u$ and lower loop line $LP_l$.

From the foreging description, it will be apparent that, according to the present invention, a new quasi-fixed protection system is obtained in a line protection switch equipment having a relatively simple construction.

We claim:
1. Line protection switch equipment in a communication system, connected between a plurality of pairs of communication lines, at least one pair of the communication lines being operatively used as a protection line and the other pairs of the communication lines being operatively used as working lines, said line protection switch equipment comprising:
   loop lines for forming a loop; and
   two-input and two-output switches, each connected to a corresponding one of the pairs of communica- tion lines and to two of said loop lines corresponding thereto and switchable between two states—a normal state in which the corresponding one of the pairs of communication lines are connected together and the two loop lines corresponding thereto are connected together and a switched state in which each line in the corresponding one of the pairs of communication lines is connected to one of said loop lines corresponding thereto, whereby at least two of said switches, connected to a faulty working line and to the protection line, may be switched from the normal state to the switched state so that the faulty working line becomes the protection line and the protection line is used in place of the faulty working line.

2. Line protection switch equipment as claimed in claim 1,
wherein each pair of communication lines includes an input line and an output line, and
wherein each of said two-input and two-output switches have a first input terminal connected to the input line in the corresponding one of the pairs of communication lines, a first output terminal connected to the output line in the corresponding one of the pairs of communication lines and second input and output terminals connected through the two of said loop lines corresponding thereto to the second output and input terminals of adjacent two-input and two-output switches, respectively.

3. Line protection switch equipment as claimed in claim 2, wherein in the normal state of each of said two-input and two-output switches the first input terminal is internally connected to the first output terminal and the second input terminal is internally connected to the second output terminal and in the switched state the first input terminal is internally connected to the second output terminal and the second input terminal is internally connected to the first output terminal.

4. Line protection switch equipment as claimed in claim 3, wherein each of said two-input and two-output switches comprises a self-latching type relay having transfer contacts, the transfer contacts of said self-latching type relay comprising four relay contacts for selectively connecting the first input terminal to one of the first output terminal and the second output terminal and for selectively connecting the second input terminal to one of the second output terminal and the first output terminal.

5. Line protection switch equipment as claimed in claim 1,
wherein each pair of communication lines include first and second communication lines and the two of said loop lines corresponding to each of said two-input and two output switches includes first and second loop lines, and
wherein each of said two-input and two-output switches comprises a self-latching type relay having transfer contacts the transfer contacts of said self-latching type relay comprising four first relay contacts for selectively connecting the first and second communication lines together and the first and second loop lines together or each of the first and second communication lines to one of the first and second loop lines and comprising four second relay contacts for selectively determining whether the first loop line is connected to the first communication line and the second loop line is connected to the second communication line or the first loop line is connected to the second communication line and the second loop line is connected to the first communication line.

6. Line protection switch equipment as claimed in claim 3, wherein each of said two-input and two-output switches is further switchable to another switchable state in which the first input terminal is internally connected to the second input terminal and the second output terminal is internally connected to the first output terminal.

7. Line protection switch equipment as claimed in claim 1,
wherein each of said two-input and two-output switches has first and second input terminals and first and second output terminals, and
wherein said two-input and two-output switches are paired by connecting the first output terminal of one of a first two-input and two-output switch to the first input terminal of a second two-input and two-output switch, two of the pairs of communication lines having a common communication line connecting the first and second two-input and two-output switches, the first input terminal of the first two-input and two-output switch being connected to one of the communication lines, the first output terminal of said another of the second two-input and two-output switches being connected to another one of the communication lines and in each of said two-input and two-output switches the second input terminal being connected through the loop formed by said loop lines to the second output terminal of an adjacent two-input and two-output switch.

* * * * *

UNITED STATES PATENT AND TRADEMARK OFFICE
CERTIFICATE OF CORRECTION

PATENT NO. : 4,733,320

DATED : March 22, 1988

INVENTOR(S) : Ikeuchi et al.

It is certified that error appears in the above-identified patent and that said Letters Patent is hereby corrected as shown below:

Col. 2, line 16, "working," should be --working--.

Col. 5, line 51, delete "the switch $SW_{1a}$, to the terminal $O_1$ of the";

line 52, delete "switch";

line 64, "$SW_{(N-1)a,}$" should be --$SW_{(n-1)a,}$--;

line 67, after "$SW_{(n+1)a,}$" insert --$SW_{1a,}$--.

Col. 10, line 8, "contacts" should be --contacts,--;

line 36, delete "one of";

line 44, delete "said another of".

Signed and Sealed this

Second Day of August, 1988

Attest:

DONALD J. QUIGG

*Attesting Officer*           *Commissioner of Patents and Trademarks*